M. J. WALSH.
VALVE.
APPLICATION FILED NOV. 15, 1911.
1,052,536.
Patented Feb. 11, 1913.
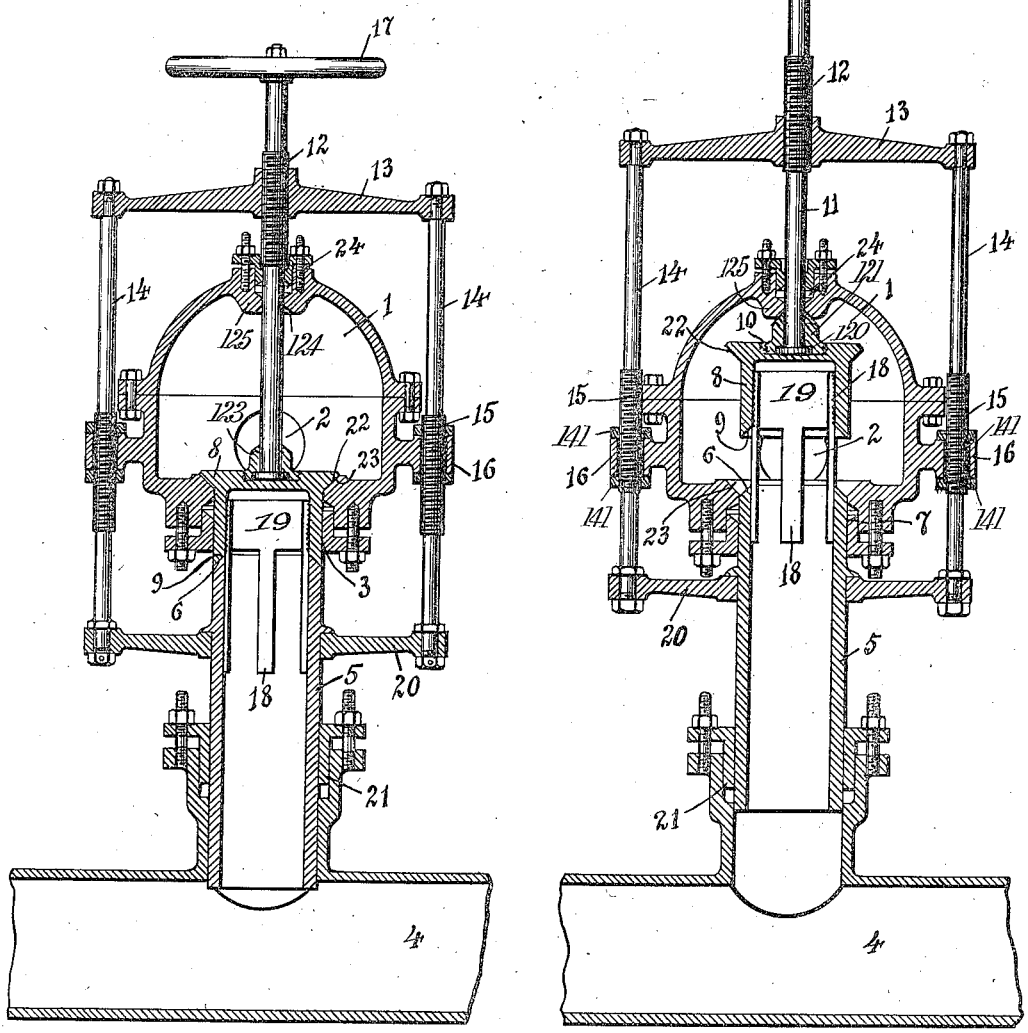
WITNESSES
INVENTOR
Michael J. Walsh
BY
ATTORNEYS

UNITED STATES PATENT OFFICE.

MICHAEL JOSEPH WALSH, OF MAHANOY CITY, PENNSYLVANIA.

VALVE.

1,052,536.  Specification of Letters Patent.  Patented Feb. 11, 1913.

Application filed November 15, 1911. Serial No. 660,366.

*To all whom it may concern:*

Be it known that I, MICHAEL J. WALSH, a citizen of the United States, and a resident of Mahanoy City, in the county of Schuylkill and State of Pennsylvania, have invented a new and Improved Valve, of which the following is a full, clear, and exact description.

The object of the invention is to produce a blow-off valve which is so constructed that the main valve and its valve seat may be moved to a position outside of the casing, whereby it may be ground or otherwise repaired, and to provide an auxiliary valve and valve seat which will effectually close the valve and prevent leakage to the atmosphere at and during the time the main valve and its valve seat are exposed for repairs.

Reference is to be had to the accompanying drawings forming a part of this specification, in which similar characters of reference indicate corresponding parts in all the views and in which—

Figure 1 represents a vertical section through a valve embodying the invention, with the parts in normal operative position; and Fig. 2 is a similar view with the main valve and its valve seat are exposed for repairs.

In the drawing, 1 represents the valve casing or dome which has a usual inlet port 2 and a discharge port 3 leading to a conduit 4 through a pipe or connection 5. The port 3 is provided with a valve seat 6 which is formed upon the upper end of the pipe 5, which pipe enters the casing 1 through a stuffing box 7, and through which it is freely movable for a purpose to be hereinafter described. In normal operation, the pipe 5 is in the position shown in Fig. 1, and the outlet port 3 is closed by means of a valve comprising the lower portion of the member 8 which has a beveled seat 9 arranged to closely fit and engage the beveled valve seat 6 at the upper end of the pipe 5.

As shown in the drawing, the member 8 is in the form of a cup open at its lower end, but closed by a top 10 at its upper end. The member 8 is swiveled loosely to the lower end of a valve stem 11, which has a head 120 fitted into the under side of a bushing 121, which has a threaded connection 122 with the recess in the top 10 of the member 8. The upper end of the bushing 121 is beveled as shown at 123 to fit the beveled seat 124 at the under side of a boss 125 formed upon the inner surface of the casing 1.

The valve stem 11 has a threaded connection 12 with the cross head 13, the said cross head being supported by rods 14 which have threaded portions 15, and which pass freely through ears 16 formed integrally with the valve casing 1. At its upper end, the valve stem 11 carries a hand wheel 17 or other means whereby it may be turned, and through the threaded connection 12, raise or lower the member 8 to connect or disconnect the valve seats 6 and 9 and the beveled parts 123 and 124. The member 8 is guided in its up and down movement by means of the guides 18 which consist of narrow metallic plates carried by a threaded sleeve 19 screwed into the opening in the member 8, and which guides have a sliding connection with the pipe 5. The valve stem 11 passes through the stuffing box 24 at the top of the casing 1.

The foregoing arrangement is such that with the parts normally in the position shown in Fig. 1, the port 3 is opened or closed by moving the member 8 away from or toward the upper end of the pipe 5. Should it be desired to grind or otherwise repair the valve at the lower end of the member 8, which may be considered to be the main valve, the pipe 5 is moved downward in the stuffing box 7 so as to bring its upper beveled end outside of the stuffing box as shown in Fig. 2, and also the lower end of the main valve will project below the stuffing box. The pipe 5 is supported by a cross-head 20 similar to the cross-head 13, the cross-head 20 being supported upon the lower ends of the rods 14. The lower end of the pipe 5 has a sliding movement in the stuffing box 21 connected to the conduit 4. The rods 14 carry nuts 141 threaded to the threaded portions 15 of the rods 14 above and below the bearings for ears 16. By means of these nuts, the cross heads 13 and 20 and pipe 5 may be raised and lowered with relation to the casing 1, so as to position the pipe 5 either as shown in Fig. 1 for normal operation, or as shown in Fig. 2 for a purpose to be hereinafter described. In the movement of the pipe from the position shown in Fig. 1 to that of Fig. 2, there will be a simultaneous movement of the member 8 without disturbing their relative position to each other, and when moved to the position shown in Fig. 2, the valve seats 6 and 9 will be outside of the stuffing box 7 whereby they may be reached for repairs.

In order to prevent leakage when the parts are in the position shown in Fig. 2, the member 8 is provided with an auxiliary valve having a seat 22, carried by a flange at its upper end, which may be engaged with an auxiliary valve seat 23 formed in the casing 1, as shown clearly in Fig. 2 of the drawing before any further movement of the parts takes place for the purpose of separating the valve seats 6 and 9 while outside of the casing. In this operation which, as has been before explained, is for the purpose of grinding or repairing the main valve, it is necessary to simultaneously adjust the cross heads 13 and 20 and pipe 5 vertically with respect to the casing 1, the stem 11 and the member 8. After the valve is closed by the auxiliary valve, as shown in Fig. 2, the pipe 5 may be still further moved downward for the purpose of disconnecting the valve seats 6 and 9 and exposing them for repair and grinding. To restore the parts to their normal position, the valve seats 6 and 9 are first brought in close contact with each other, and thereafter the pipe 5 and the member 8, together with the cross-heads 13 and 20 are moved upwardly to the position shown in Fig. 1. It will be observed that the auxiliary valve will prevent leakage if the main valve is exposed for repairs, the auxiliary valve being in engagement with its seat to close the valve, and the valve seat at the end of the pipe can be brought into engagement with the main valve to close the valve before the member 8 is raised.

In the normal operation of the valve as shown in Fig. 1, the raising of the member 8 to its extreme limit upwardly, connects the beveled parts 123 and 124, as shown clearly in Fig. 1, which effectively insures against leakage at the stuffing box 24.

Having thus described my invention, I claim as new and desire to secure by Letters Patent:

1. A valve comprising a casing, a movable valve seat normally in the casing, a stationary valve seat also within the casing, a member comprising a main valve for engagement with said movable seat and an auxiliary valve for engagement with the stationary seat, a stem having a connection with said member for moving the member into engagement with the movable seat, and means for moving said movable seat.

2. A valve comprising a casing, a valve seat movable from within to the exterior of the casing, a valve member movable within the casing and having a portion constituting the main valve which coöperates with said movable seat and is movable to the exterior of the casing therewith, a stationary valve seat within the casing, said valve member also having a portion constituting an auxiliary valve and being engageable with the stationary seat when the main valve is in its exterior position, and means to move said valve member and said movable seat.

3. A valve comprising a casing, a pipe carrying a valve seat on its inner end, means supporting said pipe from said casing and operable to move said pipe into and out of the casing whereby the valve seat on its inner end is moved, said casing having formed about the opening through which the pipe moves, an auxiliary valve seat, a cross head supported by the casing, a valve stem connected to said cross-head, a valve head carried by said stem and supported in axial alinement with said pipe, a main valve face carried by said valve head coöperating with the valve seat on the inner end of said pipe, and an auxiliary valve face carried by said valve head and coöperating with said auxiliary valve seat and suitable guides connected to the valve head and having a sliding connection with the pipe.

4. A valve comprising a casing, a pipe having a sliding connection with the casing and provided with a main valve seat at its inner end, a member movable in the casing and having a valve face for coöperating with said valve seat, cross heads having connections passing through portions of the said casing, said connections having means whereby the cross heads may be raised and lowered in order to move the pipe, one of said cross heads engaging the pipe, and a valve stem operating through the other of said cross heads and engaging the said member for moving the same, said casing being provided with an auxiliary valve seat, and said member being provided with an auxiliary valve face adapted to coöperate with the last-mentioned seat.

In testimony whereof I have signed my name to this specification in the presence of two subscribing witnesses.

MICHAEL JOSEPH WALSH.

Witnesses:
JOHN J. SUMMERS,
JOHN GOYNE.